(12) United States Patent
Shin (10) Patent No.: US 9,576,705 B2
(45) Date of Patent: Feb. 21, 2017

(54) SLEEVE SUPPORT MODULE FOR TRANSMISSION LINE

(76) Inventor: Mu Hyun Shin, Gyeonggi-do (KR)

(*) Notice: Subject to any disclaimer, the term of this patent is extended or adjusted under 35 U.S.C. 154(b) by 459 days.

(21) Appl. No.: 14/124,726

(22) PCT Filed: Jun. 14, 2012

(86) PCT No.: PCT/KR2012/004676
§ 371 (c)(1),
(2), (4) Date: Jul. 30, 2014

(87) PCT Pub. No.: WO2012/173393
PCT Pub. Date: Dec. 20, 2012

(65) Prior Publication Data
US 2015/0179309 A1      Jun. 25, 2015

(30) Foreign Application Priority Data

Jun. 16, 2011   (KR) .................. 10-2011-0058622
Dec. 5, 2011    (KR) .................. 10-2011-0128958
Dec. 5, 2011    (KR) .................. 10-2011-0128959

(51) Int. Cl.
| | |
|---|---|
| *H01B 7/00* | (2006.01) |
| *H01B 9/00* | (2006.01) |
| *F16G 13/16* | (2006.01) |
| *H02G 11/00* | (2006.01) |

(52) U.S. Cl.
CPC .............. *H01B 9/006* (2013.01); *F16G 13/16* (2013.01); *H02G 11/00* (2013.01)

(58) Field of Classification Search
CPC ............ H02G 11/00; H02G 3/00; H02G 3/02; H02G 3/04; H02G 3/0406; H02G 3/22; H02G 15/00; H02G 15/007; H02G 15/103; H01B 1/00; H01B 9/006; H01B 9/00; F16L 9/22; F16G 13/16; F16G 13/12

USPC .............. 174/40 CC, 68.1, 68.3, 72 A, 73.1, 74 R, 174/88 R, 70 C; 248/49, 68.1, 74.2, 65

See application file for complete search history.

(56) References Cited

U.S. PATENT DOCUMENTS

| | | | | |
|---|---|---|---|---|
| 6,161,373 | A * | 12/2000 | Heidrich | F16G 13/16 248/49 |
| 6,708,480 | B1 * | 3/2004 | Wehler | F16G 13/16 248/49 |
| 7,559,340 | B2 * | 7/2009 | Ikeda | F16G 13/16 138/108 |

(Continued)

FOREIGN PATENT DOCUMENTS

| | | |
|---|---|---|
| JP | 2000-161447 A | 6/2000 |
| JP | 2001-003997 A | 1/2001 |

*Primary Examiner* — Angel R Estrada
(74) *Attorney, Agent, or Firm* — Yancy IP Law, PLLC (57) ABSTRACT

There is provided a support module of a sleeve for a transmission line, which is inserted into a part of a plurality of accommodation spaces formed at a flexible sleeve for a transmission line to prevent the sleeve for a transmission line from being slack, including a flexible flat plate; a plurality of bases fixed to the flat plate so as to be arranged in a longitudinal direction of the flat plate; a plurality of slack-preventing blocks that is connected to the bases to be positioned at a top of the flat plate and prevents the flat plate from being slack by coming in contact with each other; and a plurality of bending-degree restricting blocks that is connected to the bases and the slack-preventing blocks to be positioned a bottom of the flat plate and restricts a bending degree of the flat plate by coming in contact with each other.

18 Claims, 7 Drawing Sheets

(56) References Cited

U.S. PATENT DOCUMENTS

| | | | |
|---|---|---|---|
| 7,784,259 B2 * | 8/2010 | O'Rourke | H02G 11/00 248/49 |
| 7,845,155 B2 * | 12/2010 | Jaeker | F16G 13/16 248/49 |
| 8,957,310 B2 * | 2/2015 | Kaihotsu | H02G 3/04 174/72 A |
| 9,136,653 B2 * | 9/2015 | Dickey | H02G 11/00 |
| 2004/0112625 A1 | 6/2004 | Sheikholeslami | |

* cited by examiner

Fig. 1

PRIOR ART

Fig. 2

PRIOR ART

Fig. 3

PRIOR ART

PRIOR ART

SLEEVE SUPPORT MODULE FOR TRANSMISSION LINE

TECHNICAL FIELD

The present invention relates to a support module that prevents a sleeve for a transmission line from being slack. The sleeve for a transmission is repeatedly bent and stretched without causing dust and noise while protecting a transmission line such as a cable or an air hose.

BACKGROUND ART

In recent years, a transmission line such as a cable or an air hose has been widely used to supply energy or transmit a signal in various industrial machines such as semiconductor equipment, a clean room facility, and a robot. Further, a transmission line veyor has been used to move the transmission line while safely protecting the transmission line. The transmission line veyor is also called a cable veyor.

In general, the transmission line veyor includes a plurality of unit blocks that is arranged in a line and a connection part for connecting the plurality of unit blocks. The connection part connects the plurality of unit blocks so as to allow the transmission line veyor to be bent.

However, in the transmission line veyor described above, friction between the unit blocks that are disposed adjacent to each other and friction between the unit blocks and the transmission line may be caused while the transmission line veyor is repeatedly bent and stretched. Accordingly, in the transmission line veyor, noise and dust may be generated while the transmission line veyor is repeatedly bent and stretched. The noise aggravates working conditions and the dust causes malfunction in the industrial machine. For this reason, a countermeasure against such problems needs to be established.

Figure 1:
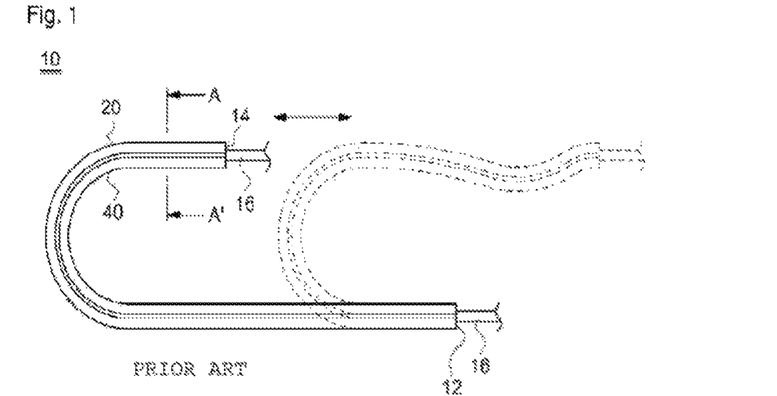
FIG. 1 is a side view of a sleeve for a transmission line.
Figure 2:
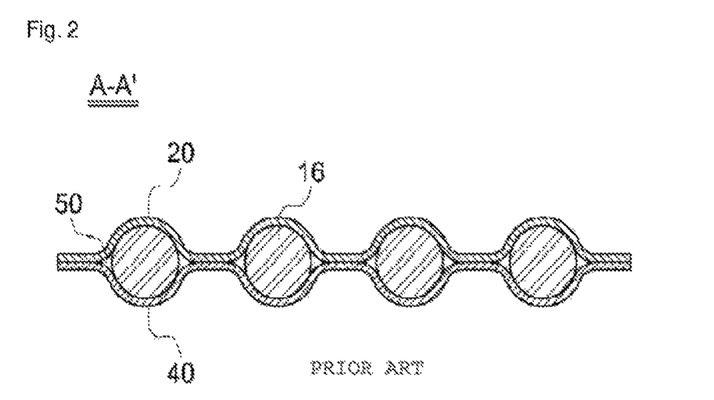
FIG. 2 is a cross-sectional view taken along A-A' of FIG. 1.

As the countermeasure, a flexible sleeve has a structure shown in FIGS. 1 and 2. FIG. 1 is a side view of a sleeve for a transmission line, and FIG. 2 is a cross-sectional view taken along A-A' of FIG. 1.

A sleeve 10 for transmission line includes one end 12 that is fixed to a fixation part of an industrial machine and the other end 14 that is fixed to a movement part of the industrial machine to reciprocate together with the movement part. Further, the sleeve 10 includes a flexible upper member 20 and a flexible lower member 40. Parts of the upper member 20 and parts of the lower member 40 are attached to each other as illustrated in FIG. 2, and transmission lines 16 are inserted into accommodation spaces 50 between other parts of the upper member 20 and other parts of the lower member 40 that are not attached to each other.

Figure 3:
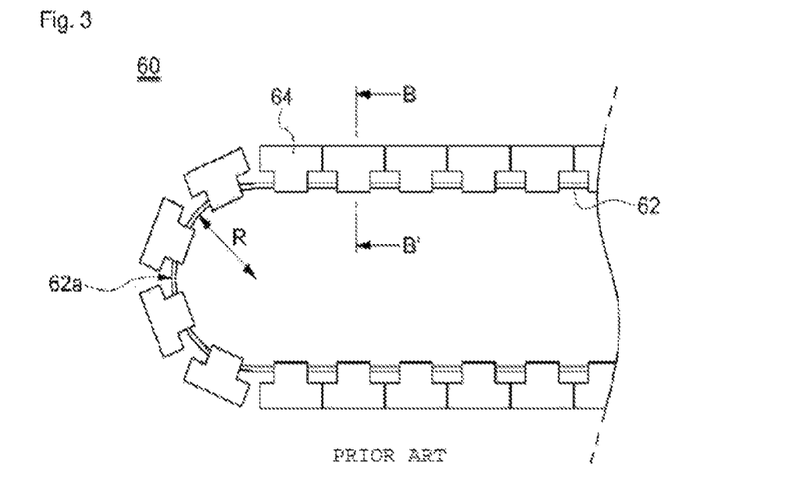
FIG. 3 is a side view of a support module of a sleeve for transmission line according to the related art.

Since the sleeve 10 does not have joints, dust and noise are hardly generated even when the sleeve is repeatedly bent and stretched. However, when the sleeve 10 is long and the transmission lines 16 are heavy, the sleeve 10 is slack by the self-weight of the transmission lines 16 as shown in FIG. 1. Accordingly, a support module for preventing the slack is inserted into two accommodation spaces that are disposed at the outermost positions. Hereinafter, a support module according to the related art will be described with reference to FIGS. 3 and 4. FIG. 3 is a side view of a support module of a sleeve for a transmission line according to the related art, and FIG. 4 is a cross-sectional view taken along B-B' of FIG. 3.

Figure 4:
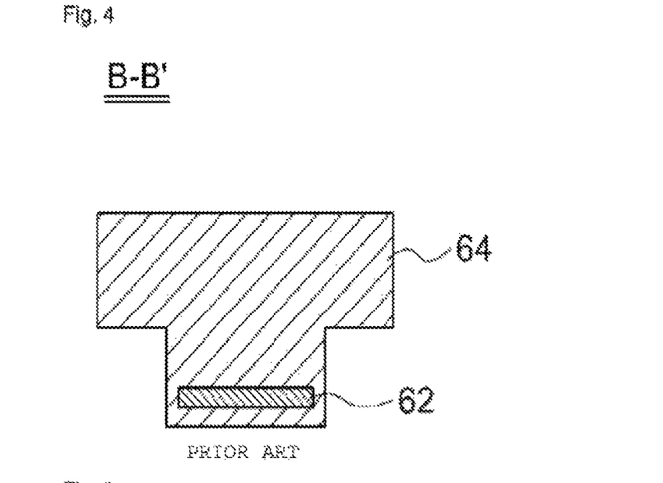
FIG. 4 is a cross-sectional view taken along B-B' of FIG. 3.

As show in FIGS. 3 and 4, a sleeve support module 60 according to the related art includes a flexible flat plate 62 and a plurality of slack-preventing blocks 64 that is fixed to the flat plate 62 so as to be arranged in a longitudinal direction of the flat plate 62. The flat plate 62 extends to penetrate through lower ends of the slack-preventing blocks 64, so that the slack-preventing blocks 64 are fixed to the flat plate 62.

When the flat plate 62 is bent, the neighboring slack-preventing blocks 64 are spaced apart from each other. However, when the flat plate 62 is stretched, the neighboring slack-preventing blocks 64 come in contact with each other. Accordingly, when the support module 60 is inserted into the accommodation spaces 50 of the sleeve 10 for a transmission line, it is possible to prevent the sleeve 10 from being slack.

However, in the support module 60, the radius of curvature R of the bent flat plate 62 is not restricted. Accordingly, when a force is applied to the support module 60 while being bent as illustrated in FIG. 3, there is a problem in that a bent portion 62a of the flat plate 62 is broken.

Further, in the support module 60, the flat plate 62 extends to penetrate through the lower ends of the slack-preventing blocks 64, so that the slack-preventing blocks 64 are fixed to the flat plate 62. For this reason, there is a problem in that it is difficult to replace only a part of the plurality of slack-preventing blocks 64.

Furthermore, when the support module is inserted into the sleeve 10 and then is not fixed thereto, the support module 60 may be separated from the accommodation spaces 50 during the reciprocating of the other end 14 of the sleeve. Accordingly, a means for fixing the support module 60 to the sleeve 10 is needed.

Moreover, in the support module 60, weights of portions positioned between the bent portion 62a of the flat plate 62 and the other end 14 are offset only by a weak elastic restoring force of the bent flat plate 62. Accordingly, in the support module 60, the radius of curvature R of the sleeve 10 is hardly restricted.

Moreover, in the support module 60, the sleeve 10 is prevented from being slack by allowing the slack-preventing blocks 64 to come in contact with each other, but the slack is prevented only when the sleeve 10 is relatively short. Accordingly, when the sleeve 10 is long, the sleeve 10 is slack even when the support module 60 is used.

DISCLOSURE

Technical Problem

An object of the present invention is to provide a support module of a sleeve for transmission line capable of being bent while restricting the radius of curvature, replacing only a part of slack-preventing blocks, and being firmly fixed to the sleeve.

An object of the present invention is to also provide a support module of a sleeve for transmission line capable of being bent while further restricting the radius of curvature of a sleeve than a support module of the related art and preventing even a sleeve longer that a sleeve of the related art from being slack.

Technical Solution

An exemplary embodiment of the present invention provides a support module of a sleeve for a transmission line that is inserted into a part of a plurality of accommodation spaces formed at a flexible sleeve for a transmission line to prevent the sleeve for a transmission line from being slack. The support module includes a flexible flat plate; a plurality of bases that is fixed to the flat plate so as to be arranged in a longitudinal direction of the flat plate; a plurality of slack-preventing blocks that is connected to the bases so as to be positioned at a top of the flat plate and prevents the flat plate from being slack by coming in contact with each other; and a plurality of bending-degree restricting blocks that is connected to the bases and the slack-preventing blocks so as to be positioned a bottom of the flat plate and restricts a bending degree of the flat plate by coming in contact with each other.

Projections may be formed at a top surface and a bottom surface of the base, and holes into which the projections are inserted may be formed in the slack-preventing block and the bending-degree restricting block.

Protrusions may be formed at any one left and right sidewalls of the slack-preventing block and left and right sidewalls of the bending-degree restricting block that are spaced apart in a width direction of the flat plate, and hooked holes into which the protrusions are hooked may be formed in the other left and right sidewalls.

Front and rear surfaces that extend in a width direction of the flat plate among side surfaces of the bending-degree restricting block may be inclined surfaces in which as the front and rear surfaces are farther from the flat plate, the front and rear surfaces are close to each other.

A projection may be formed at the front surface of the bending-degree restricting block, an insertion groove having a ceiling may be formed at the rear surface of the bending-degree restricting block, and a top surface of the projection may be an inclined surface in which as the top surface is farther from the front surface, the top surface is farther from the flat plate.

The support module according the exemplary embodiment of the present invention may further include finishing members that are connected to both ends of the sleeve for a transmission line to fix the bases.

The finishing member may include an upper block and a lower block that are connected to each other while pressing the both ends of the sleeve for a transmission line and the bases that are positioned at the both ends.

Projections may be formed at a top surface or a bottom surface of the base, through holes through which the projections pass may be formed in the both ends of the sleeve for a transmission line, and insertions holes into which the projections that have passed through the through holes are inserted may be formed in the upper block and the lower block.

The finishing member may include an upper lid that extends from the upper block and a lower lid that extends from the lower block, and portions of the sleeve for a transmission, which accommodate the outermost slack-preventing block and the outmost bending-degree restricting block, may be positioned between the upper lid and the lower lid.

Gaps may be formed between lower ends of both side surfaces of the upper lid and upper ends of both side surfaces of the lower lid.

An exemplary embodiment of the present invention also provides a support module of a sleeve for a transmission line that is inserted into a part of a plurality of accommodation spaces formed at a flexible sleeve for a transmission line to prevent the sleeve for a transmission line from being slack. The support module includes a flexible flat plate; and a plurality of slack-preventing blocks that prevents the flat plate from being slack by coming in contact with each other at a top of the flat plate. Linear convex portions that extend in a longitudinal direction of the flat plate may be formed at an outer surface of the flat plate.

The linear convex portions may be formed at a bottom surface of the flat plate, and linear concave portions that extend in the longitudinal direction of the flat plate while facing the linear convex portions may be formed at a top surface of the flat plate.

The linear convex portions may be formed at a top surface of the flat plate, and linear concave portions that extend in the longitudinal direction of the flat plate while facing the linear convex portions may be formed at a bottom surface of the flat plate.

The linear convex portions may be formed at both of a top surface and a bottom surface of the flat plate.

The linear convex portions may be positioned to be symmetrical with a central line of the flat plate.

The support module according the exemplary embodiment of the present invention may further include a plurality of bases that is fixed to the flat plate so as to be arranged in a longitudinal direction and is connected to the slack-preventing blocks; and a plurality of bending-degree restricting block that is connected to the bases and the slack-preventing blocks so as to be positioned at a bottom of the flat plate and restricts a bending degree of the flat plate by coming in contact with each other.

Projections may be formed at a top surface and a bottom surface of the base, and holes into which the projections are inserted may be formed in the slack-preventing block and the bending-degree restricting block.

Protrusions may be formed at any one left and right sidewalls of the slack-preventing block and left and right sidewalls of the bending-degree restricting block that are spaced apart in a width direction of the flat plate, and hooked holes into which the projections are hooked may be formed at the other left and right sidewalls.

Effect of the Invention

According to an exemplary embodiment of the present invention, it is possible to restrict the radius of curvature of the bent support module by the bending-degree restricting blocks.

Further, according to an exemplary embodiment of the present invention, it is possible to fix the support module to the sleeve by the finishing members.

Furthermore, according to an exemplary embodiment of the present invention, since stress applied to the upper block and the lower block of the finishing member is dispersed into the upper lid and the lower lid, it is possible to prevent the lifespan of the finishing member from being reduced.

Moreover, according to an exemplary embodiment of the present invention, since the movement of the sleeve in a vertical direction is guaranteed to some extent between the upper lid and the lower lid, the impact of the upper lid and the lower lid on the sleeve can be relieved.

In another exemplary embodiment of the present invention, the linear convex portions and the linear concave portions suppress bending of the bent portion of the flat plate and suppress other portions from being slack. Accordingly, according to another exemplary embodiment of the present invention, the radius of curvature of the sleeve can be further restricted than a support module of the related art, and even a sleeve longer than a sleeve used in the related art can also be prevented from being slack.

Further, according to another exemplary embodiment of the present invention, since the bending-degree restricting blocks are provided in addition to the linear convex portions and the linear concave portions, it is possible to more securely restrict the radius of curvature of the sleeve.

Furthermore, according to the embodiments of the present invention, since the slack-preventing blocks and the bending-degree restricting blocks can be detachably attached, it is possible to individually replace the slack-preventing blocks and the bending-degree restricting blocks.

Moreover, according to the embodiments of the present invention, the slack-preventing blocks and the bending-degree restricting blocks can be easily aligned on the flat plate, and the slack-preventing blocks and the bending-degree restricting blocks can be easily assembled.

BEST MODE

Hereinafter, a support module of a sleeve for a transmission line according to preferred exemplary embodiments of the present invention will be described with reference to the drawings. Terms and words used herein and claims are not interpreted as the meaning generally used in the dictionary, but should be interpreted as the meaning and concept coincident with the technological sprit of the present invention on the basis of a fundamental rule that an inventor can suitably define the concept of corresponding terms to describe his or her invention using the best method.

First Exemplary Embodiment

Figure 5:
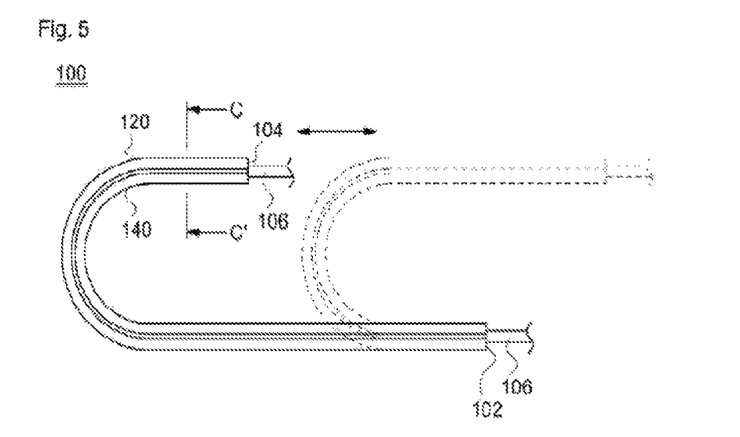
FIG. 5 is a side view of a sleeve for transmission line supported by a support module of a sleeve for transmission line according to the present invention.

As shown in FIG. 5, a sleeve 100 for a transmission line supported by a support module 200 according to a first exemplary embodiment of the present invention includes one end 102 that is fixed to a fixation part of an industrial machine such as semiconductor equipment, a clean room facility, or a robot and the other end 104 that is fixed to a movement part of the industrial machine. Since the sleeve 100 for a transmission line continuously extends from the one end 102 to the other end 104, the sleeve does not include joints.

Figure 6:
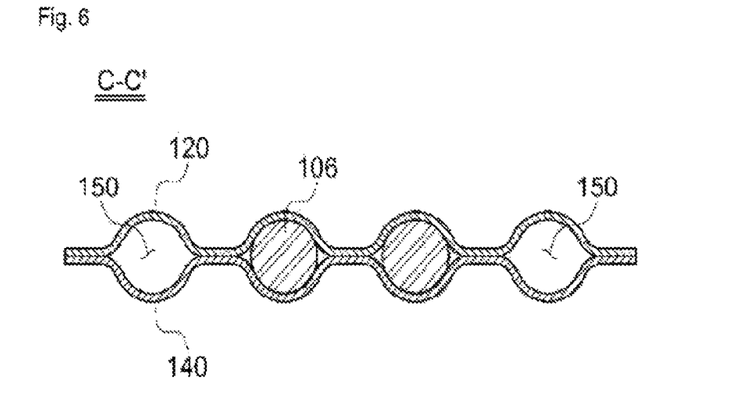
FIG. 6 is a cross-sectional view taken along C-C' of FIG. 5.

The sleeve 100 for a transmission line includes accommodation spaces 150 for accommodating transmission lines 106 such as a cable or an air hose as shown in FIG. 6. The accommodation spaces 150 extend in a longitudinal direction of the sleeve 100 and are arranged in parallel with one another in a width direction. Further, the accommodation spaces 150 are formed by an upper sheet 120 and a lower sheet 140. Here, the upper sheet 120 and the lower sheet 140 are flexible so as to allow the sleeve 100 to be bent and stretched.

The support module 200 according to the present exemplary embodiment prevents the sleeve 100 from being slack by being inserted into parts of the plurality of accommodation spaces 150 formed at the flexible sleeve 100 having the above-described configuration, for example, two accommodation spaces 150 that are disposed at the outermost positions as shown in FIG. 6, and includes a flat plate 210, a plurality of bases 230, a plurality of slack-preventing blocks 250, a plurality of bending-degree restricting blocks 270, and finishing members 300.

Figure 8:
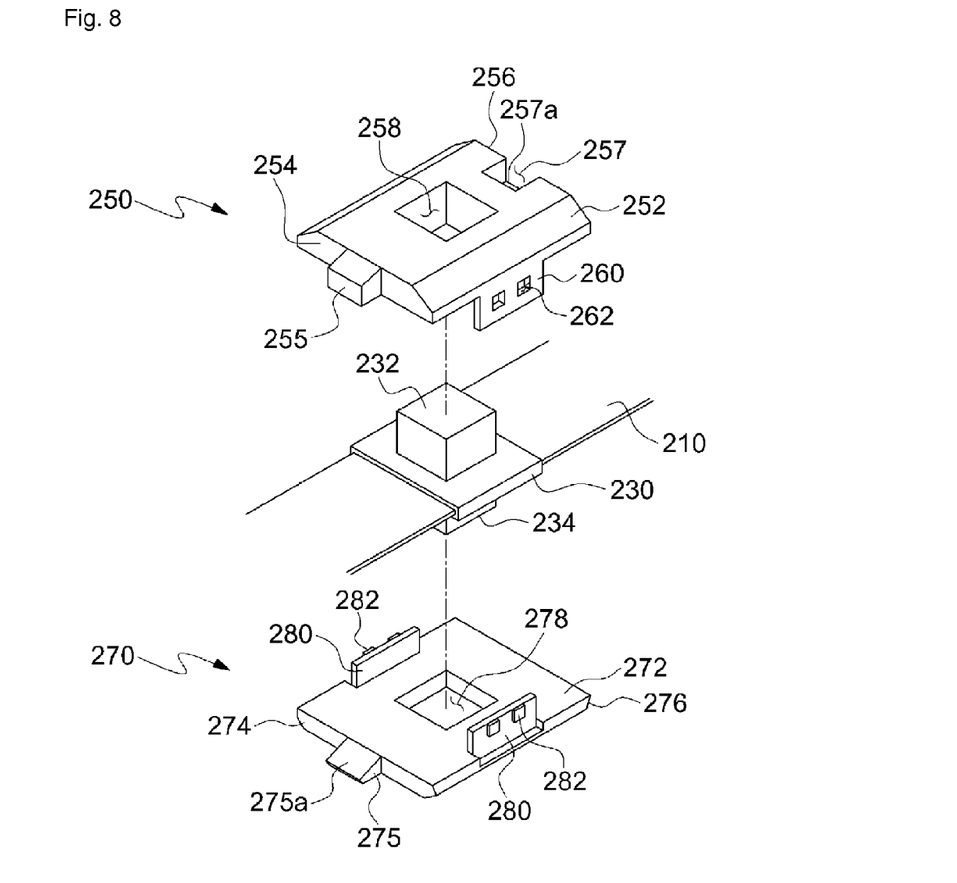
FIG. 8 is a partial exploded perspective view of the support module shown in FIG. 7.

The flat plate 210 is made of a stainless steel material, and is formed at a thickness capable of having flexibility. Further, the plurality of bases 230 is arranged in a longitudinal direction of the flat plate 210, and is fixed to the flat plate 210 so as to allow the flat plate 210 to pass in the bases. Furthermore, an upper projection 232 is formed at a top surface of the base 230, and a lower projection 234 is formed at a bottom surface of the base 230.

The slack-preventing block 250 includes a body 252 having a front surface 254 and a rear surface 256. A projection 255 is formed at the front surface 254, and an insertion groove 257 having a bottom 257a is formed at the rear surface 256. The projection 255 is inserted in the insertion groove formed at the front slack-preventing block that is positioned in front of the projection, and the insertion groove 257 accommodates the projection formed at the rear slack-preventing block that is positioned at the rear of the insertion groove.

Figure 9:
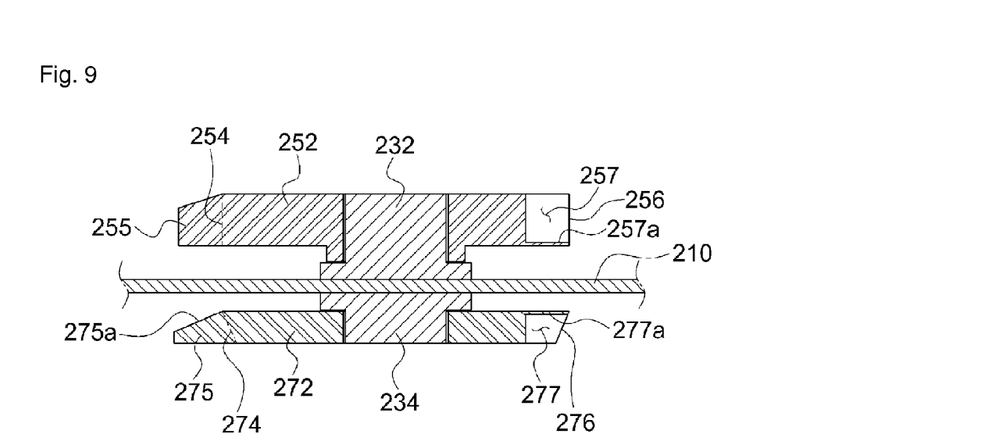
FIG. 9 is a partial longitudinal cross-sectional view of the support module shown in FIG. 7.

When the flat plate 210 is stretched, the front surface 254 comes in contact with the rear surface formed at the front slack-preventing block, the rear surface 256 comes in contact with the front surface formed at the rear slack-preventing block, and a bottom surface of the projection formed at the front surface of the rear slack-preventing block comes in contact with the bottom 257a of the insertion groove 257. Moreover, the stretched flat plate 210 is prevented from being slack through the aforementioned contacting.

Meanwhile, a hole 258 is formed in the body 252 of the slack-preventing block 250. The upper projection 232 of the base 230 is inserted into the hole 258. In addition, left and right sidewalls 260 that protrude downward are formed at left and right ends of the body 252 of the slack-preventing block 250, and hooked holes 262 are formed in the left and right sidewalls 260.

The bending-degree restricting block 270 includes a body 272 having a front surface 274 and a rear surface 276. The rear surface 276 is an inclined surface in which as the rear surface is farther from the flat plate 210, the rear surface is close to the front surface 274, and the front surface 274 is an inclined surface in which as the front surface is farther from the flat plate 210, the front surface is close to the rear surface 276.

A projection 275 is formed at the front surface 274 of the body 272 of the bending-degree restricting block 270, and an insertion groove 277 having a ceiling 277a is formed at the rear surface 276 thereof. At this time, a top surface 275a of the projection 275 is an inclined surface in which as the top surface is farther from the front surface 274, the top surface is father from the flat plate 210. Meanwhile, the projection 275 is inserted into the insertion groove formed at the front bending-degree restricting block that is positioned in front of the projection, and the insertion groove 277 accommodates the projection formed at the rear bending-degree restricting block that is positioned at the rear of the insertion groove.

When the flat plate 210 is bent, the rear surface 276 of the body 272 of the bending-degree restricting block 270 comes in contact with the front surface formed at the rear bending-degree restricting block, the front surface 274 of the body 272 of the bending-degree restricting block 270 comes in contact with the rear surface formed at the front bending-degree restricting block, and the top surface of the projection formed at the front surface of the rear bending-degree restricting block comes in contact with the ceiling 277a of the insertion groove 277. The radius of curvature of the bent flat plate 210 is restricted through the aforementioned contacting.

Meanwhile, a hole 278 is formed in the body 272 of the bending-degree restricting block 270. The lower projection 234 of the base 230 is inserted into the hole 278. Further, left and right sidewalls 280 that protrude upward are formed at left and right ends of the body 272 of the bending-degree restricting block 270, and protrusions 282 are formed at the left and right sidewalls 280. The protrusions 282 are hooked into the hooked holes 262 formed at the left and right sidewalls 260 of the body 252 of the slack-preventing block 250.

The support module 100 of the sleeve for a transmission line described above is assembled by fixing the bases 230 to the flat plate 210 and then by connecting the slack-preventing blocks 250 and the bending-degree restricting blocks 270 to the bases 230. The bases 230 are fixed to the flat plate 210 by a method such as insert-injection. Furthermore, when the slack-preventing blocks 250 are connected to the bases 230, the upper projections 232 of the bases 230 are inserted into the holes 258 of the slack-preventing blocks 250. Thereafter, when the bending-degree restricting blocks 270 are connected, the lower projections 234 of the bases 230 are inserted into the holes 278 of the bending-degree restricting blocks 270, and the protrusions 282 of the left and the right sidewalls 280 of the bending-degree restricting blocks 270 are hooked into the hooked holes 262 formed at the left and right sidewalls 260 of the slack-preventing blocks 250.

Figure 7:
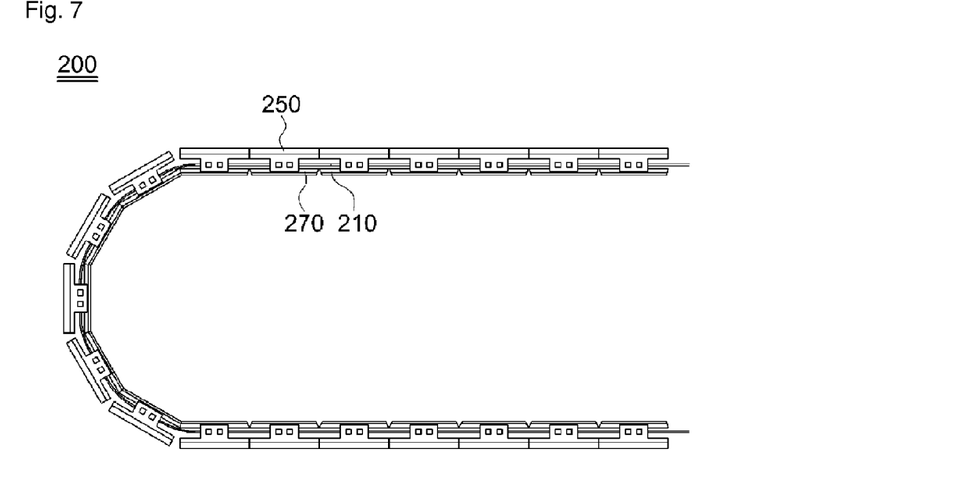
FIG. 7 is a side view of a support module of a sleeve for transmission line according to a first exemplary embodiment of the present invention.

As described above, the support module 200 is inserted into the accommodation spaces 150 of the sleeve 100 for a transmission line, so that the sleeve 100 for a transmission line is prevented from being slack and the bending thereof is restricted. However, when the support module is inserted in the accommodation spaces 150 and then is not fixed thereto, the support module 200 may be separated from the accommodation spaces 150 during the reciprocating of the other end 104 of the sleeve. Accordingly, the support module 200 further includes the finishing members 300.

Figure 10:
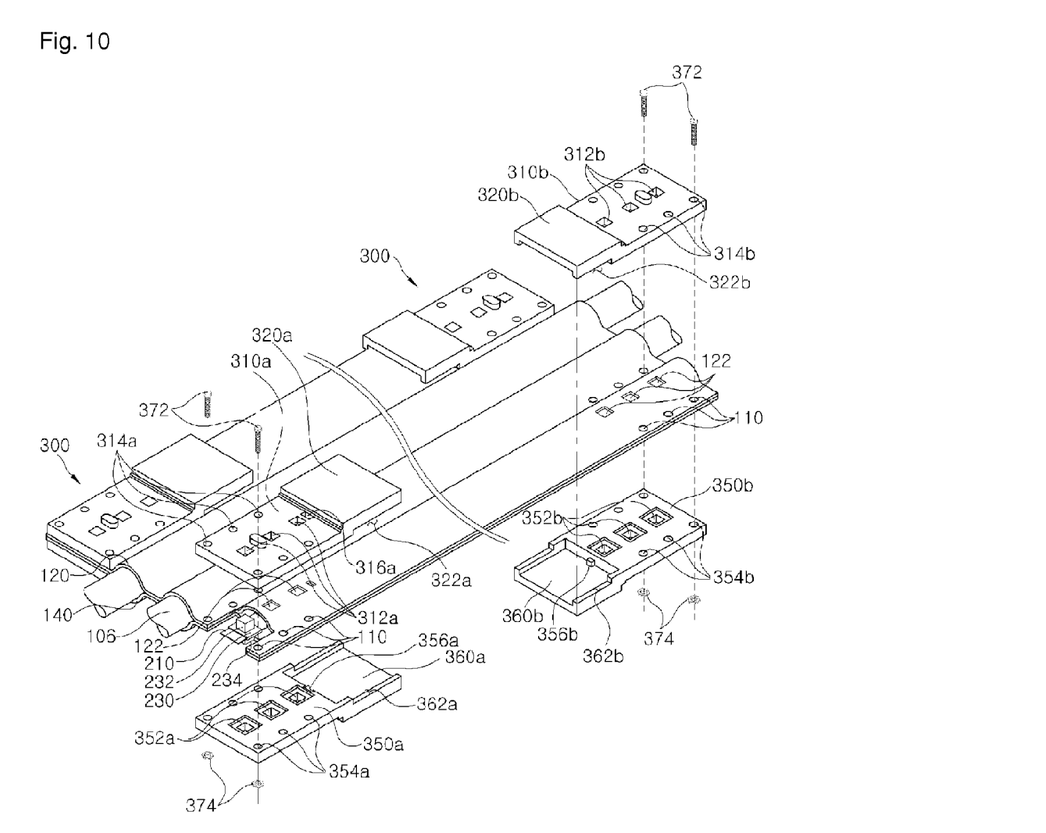
FIG. 10 is an exploded perspective view of finishing members of the support module shown in FIG. 7.

The finishing members 300 are provided to fix the bases 230 to both ends of the sleeve 100, and include a first upper block 310a, a second upper block 320a, a first lower block 350a, and a second lower block 350b, as shown in FIG. 10.

The first upper block 310a and the second upper block 310b are positioned so as to respectively come in contact with an outer surface of the other end and an outer surface of one end of the upper sheet 120 of the sleeve. Moreover, the first upper block 310a and the second upper block 310b are provided with a plurality of insertion holes 312a and 312b, and the upper projections 232 of the bases 230 fixed to one end and the other end of the flat plate 210 are inserted into the insertion holes 312a and 312b. The slack-preventing blocks 250 are not connected to the bases 230 fixed to the one end and the other end of the flat plate 210 so as to allow the upper projections 232 to be inserted into the insertion holes 312a and 312b, and through holes 122 through which the upper projections 232 pass are formed in the upper sheet 120 of the sleeve.

The first lower block 350a and the second lower block 250b are positioned to respectively come in contact with an outer surface of one end and an outer surface of the other end of the lower sheet 140 of the sleeve. Further, the first lower block 350a and the second lower block 350b are provided with a plurality of insertion holes 352a and 352b, and the lower projections 234 of the bases 230 fixed to the one end and the other end of the flat plate 210 are inserted into the insertion holes 352a and 352b. The bending-degree restricting blocks 270 are not connected to the bases 230 fixed to the one end of the flat plate 210 so as to allow the lower projections 234 to be inserted into the insertion holes 352a and 352b, and through holes (not shown) through the lower projections 234 pass are formed in the lower sheet 140 of the sleeve.

The first upper block 310a and the first lower block 350a, and the second upper block 310b and the second lower block 350b are connected to each other by bolts 372 and nuts 374. At this time, the bolts 372 sequentially pass through bolt holes 314a (314b) of the upper block 310a (310b), bolt holes 110 of the sleeve 100, and bolt holes 354a (354b) of the lower block 350a (350b), and are then connected to the nuts 374. The upper blocks 310a and 310b and the lower blocks 350a and 350b that are respectively connected to each other press the both ends of sleeve 100 and the bases 230 that are positioned at the both ends of the sleeve 100, so that the bases 230 are fixed to the both ends of the sleeve 100.

Holes 316a and 356a are formed in one end of the first upper block 310a and one end of the first lower block 350a. The projection 255 formed at the front surface 254 of the slack-preventing block 250 disposed at the outermost position is inserted into the hole 316a of the first upper block 310a, and the projection 275a formed at the front surface 274 of the bending-degree restricting block 270 disposed at the outermost position is inserted into the hole 356a of the first lower block 350a.

Moreover, protrusions 356b are formed at one end of the second upper block 310b and one end of the second lower block 350b. The protrusion (not shown) of the second upper block 310b is inserted into the groove 257 formed at the rear surface 256 of the other slack-preventing block 250 disposed at the outermost position, and the protrusion 356b of the second lower block 350b is inserted into the groove 277 formed at the rear surface of the other bending-degree restricting block 270 disposed at the outermost position.

Meanwhile, the finishing members 300 further include a first upper lid 320a, a second upper lid 320b, a first lower lid 360a, and a second lower lid 360b.

The first upper lid 320a extends from the one end of the first upper block 310a toward the second upper block 310b in the longitudinal direction of the sleeve 100, and the second upper lid 320a extends from the one end of the second upper block 310*b* toward the first upper block 310*a* in the longitudinal direction of the sleeve 100. In addition, the first lower lid 360*a* extends from the one end of the first lower block 350*a* toward the second lower block 350*b* in the longitudinal direction of the sleeve 100, and the second lower lid 360*b* extends from the second lower block 350*b* toward the first lower block 350*a* in the longitudinal direction of the sleeve 100. Portions of the sleeve 100, which accommodate the outermost slack-preventing block and the outermost bending-degree restricting block, are positioned between the first upper lid 320*a* and the first lower lid 360*a*, and portions of the sleeve 100 which accommodate the other outermost slack-preventing block and the other outermost bending-degree restricting block are positioned between the second upper lid 320*b* and the second lower lid 360*b*.

When the finishing members 300 do not include the upper lids 320*a* and 320*b* and the lower lids 360*a* ad 360*b*, since stress is concentrated on the upper blocks 310*a* and 310*b* and the lower blocks 350*a* and 350*b* during the reciprocating of the other end 104 of the sleeve, the lifespan of the finishing members 300 may be reduced. However, when the finishing members 300 include the upper lids 320*a* and 320*b* and the lower lids 360*a* and 360*b*, since the stress is dispersed into the upper lids 320*a* and 320*b* and the lower lids 360*a* and 360*b*, the lifespan of the finishing members 300 can be prevented from being reduced.

Meanwhile, it is preferable that gaps 322*a*, 362*a*, 322*b* and 362*b* be formed between lower ends of both side surfaces of the upper lids 320*a* and 320*b* and upper ends of both side surfaces of the lower lids 360*a* and 360*b*. In this case, since the movement of the sleeve 100 in a vertical direction is guaranteed to some extent between the upper lids 320*a* and 320*b* and the lower lids 360*a* and 360*b*, the impact of the upper lids 320*a* and 320*b* and the lower lids 360*a* and 360*b* on the sleeve 100 can be relieved.

Second Exemplary Embodiment

A sleeve 100 for a transmission line supported by a support module according to a second exemplary embodiment of the present invention is the same as the sleeve described in the first exemplary embodiment. Accordingly, the sleeve 100 for a transmission line will not be described.

Figure 11:
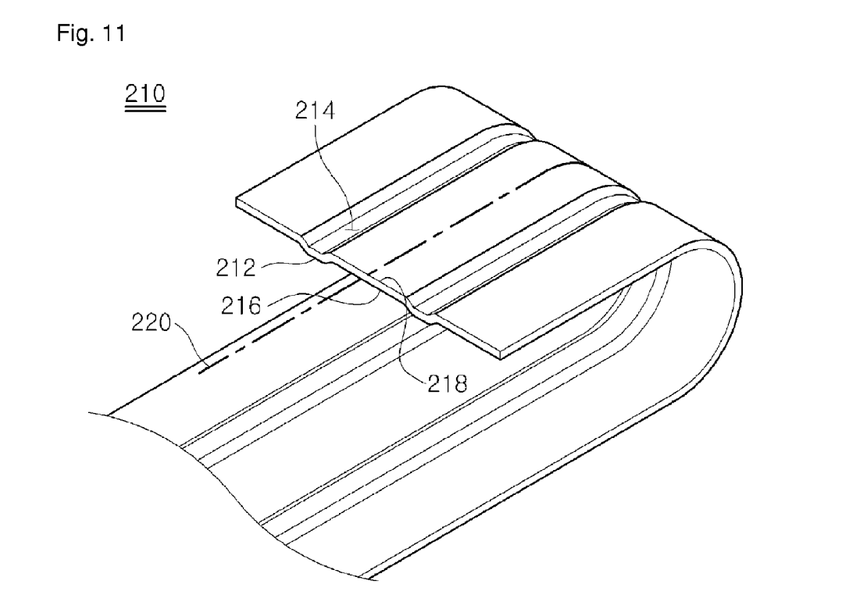
FIG. 11 is a partial perspective view of a flat plate included in a support module of a sleeve for transmission line according to a second exemplary embodiment of the present invention.

The support module of the sleeve for a transmission line according to the present exemplary embodiment is inserted into parts of a plurality of accommodation spaces 150 formed at the sleeve 100 to prevent the sleeve 100 from being slack, and includes a flat plate 210 illustrated in FIG. 11. The flat plate 210 is made of a stainless steel material, and has a thickness capable of having flexibility.

In the present exemplary embodiment, the flat plate 210 functions to prevent the sleeve from being slack and to restrict a bending degree. To achieve this, the flat plate 210 includes two linear convex portions 212 and two linear concave portions 214 as shown in FIG. 11. At this time, the linear convex portions 212 are formed on a bottom surface 216 of the flat plate 210 and extend in a longitudinal direction of the flat plate 210. Furthermore, the linear concave portions 214 are formed on a top surface 218 of the flat plate 210 and extend in the longitudinal direction of the flat plate 210 while facing the linear convex portions 212. Meanwhile, when the flat plate 210 is bent, the top surface 218 of the flat plate 210 means a surface facing outward, and the bottom surface 216 of the flat plate 210 means a surface opposite to the top surface of the flat plate 210.

The linear convex portions 212 and the linear concave portions 214 having the above-described configuration suppress the bending of the bent portions of the flat plate 210 and suppress other portions from being slack. Accordingly, the support module of the sleeve for a transmission line including the flat plate 210 can further suppress the radius of curvature of the sleeve 100 as compared to the support module according to the related art and can prevent even a sleeve longer than the sleeve used in the related art from being slack.

Figure 12:
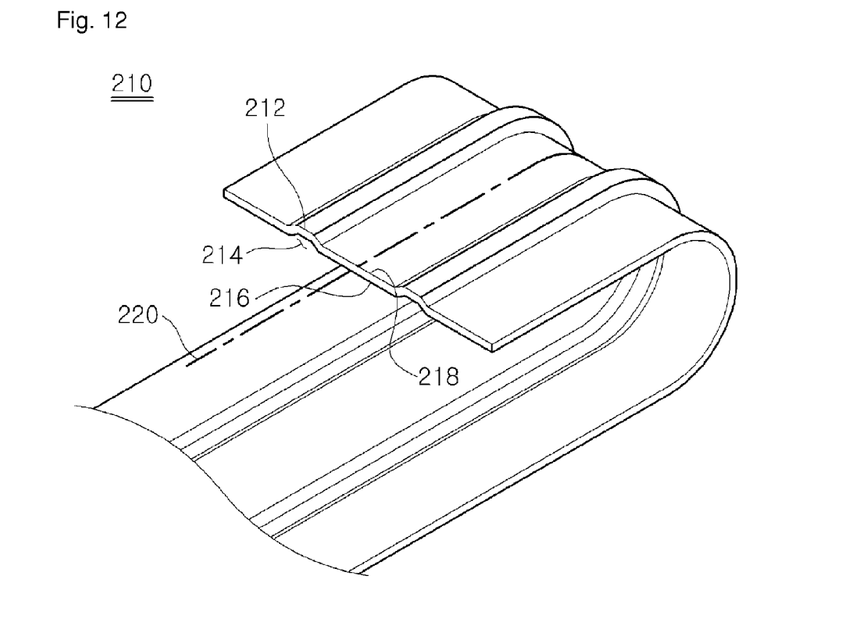
FIGS. 12 and 13 are partial perspective views of modified examples of the flat plate shown in FIG. 11.

On the other hand, the positions of the linear convex portions 212 and the linear concave portions 214 may be reversed to each other. That is, as shown in FIG. 12, the linear convex portions 212 may be formed at the top surface 218 of the flat plate 210, and the linear concave portions 214 may be formed at the bottom surface 216 of the flat plate 210.

Figure 13:
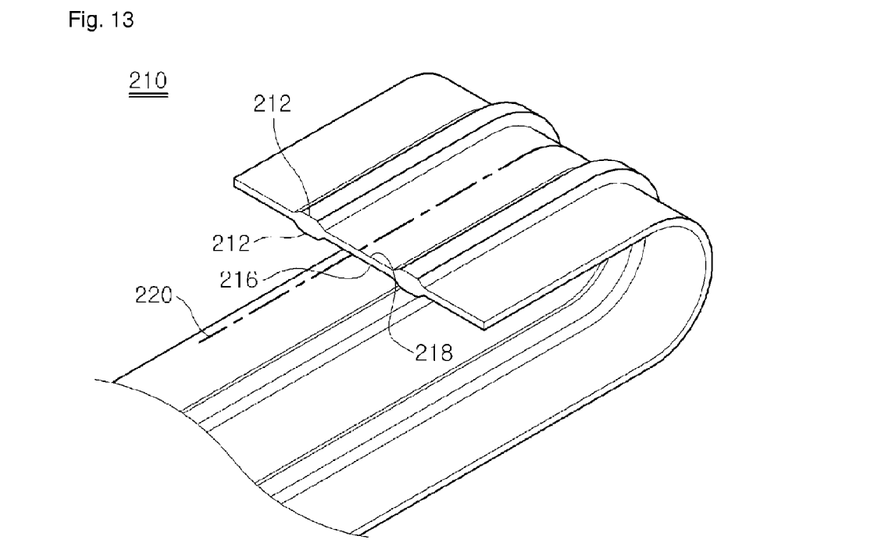

Further, as shown in FIG. 13, only the linear convex portions 212 may be formed at both of the top and bottom surfaces 216 and 218 of the flat plate 210 without forming the linear concave portions 214.

Although not shown, only the linear convex portions 212 may be formed at only the top surface 218 or the bottom surface 216 of the flat plate 210 without the linear concave portions 214. These examples can less suppress the slack and the bending of the flat plate 210 than the examples shown in FIGS. 11 to 13, but can further suppress than the support module according to the related art not having the linear convex portions 212 and the linear concave portions 214.

The number of the linear convex portions 212 and the number of the linear concave portions 214 may be larger or smaller than the aforementioned example depending on degrees of suppressing the bending and the slack. Furthermore, the linear convex portions 212 and the linear concave portions 214 are positioned to be symmetrical with a central line 220 that extends in the longitudinal direction of the flat plate 210 so as to suppress the bending and the slack at the same degree at both sides of the central line 220.

The support module of the sleeve for a transmission line according to the present exemplary embodiment may be implemented in various forms as long as the support module includes the flat plates 210 of the above-described examples.

For example, the support module of the sleeve for a transmission line according to the present exemplary embodiment may be implemented as described in the first exemplary embodiment. In this case, as shown in FIGS. 14 and 15, the bases 230 of the first exemplary embodiment are fixed to the flat plate 210 including the linear convex portions 212 and the linear concave portions 214, and the slack-preventing blocks 250 and the bending-degree restricting blocks 270 of the first exemplary embodiment are connected to the bases 230.

Figure 16:
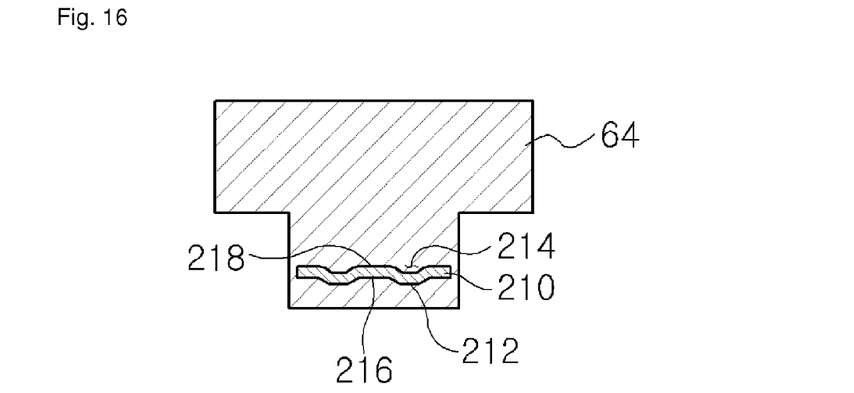
FIG. 16 is a longitudinal cross-sectional view of another support module of a sleeve for transmission line including the flat plate of FIG. 11.

Moreover, as shown in FIG. 16, the support module of the sleeve for a transmission line according to the present exemplary embodiment may be implemented by replacing the flat plate 62 included in the support module 60 (see FIGS. 3 and 4) according to the related art with the flat plate 210 including the linear convex portions 212 and the linear concave portions 214.

Figure 14:
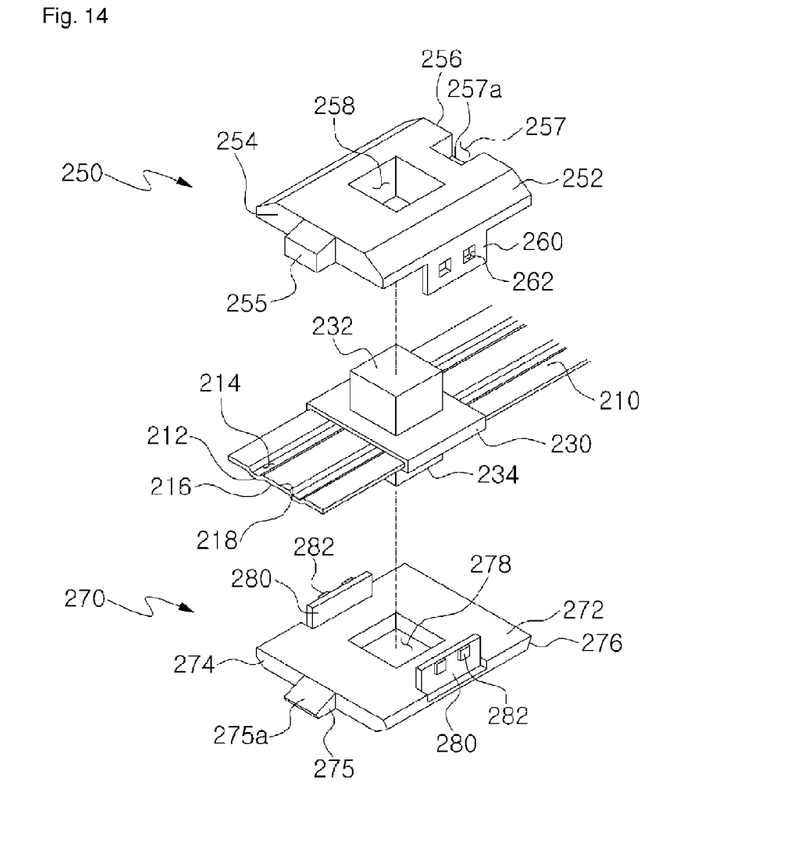
FIG. 14 is a partial exploded perspective view of a support module of a sleeve for transmission line including the flat plate of FIG. 11.
Figure 15:
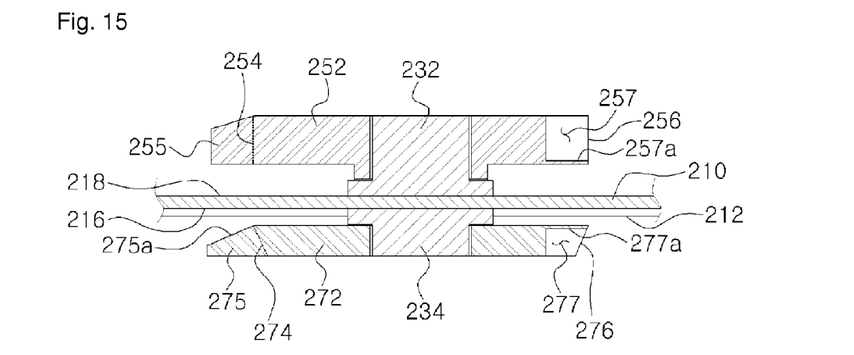
FIG. 15 is a partial longitudinal cross-sectional view of the support module illustrated in FIG. 14.

Meanwhile, although FIGS. 14 to 16 have illustrated the support module including the flat plate 210 shown in FIG. 11, the drawings are intended for purposes of simplifying the illustration only and are not intended to mean that the support module of the sleeve for a transmission line according to the present exemplary embodiment can include only the flat plate 210 shown in FIG. 11.

Although the present invention has been described in conjunction with the limited exemplary embodiments and drawings, the present invention is not limited thereto. It will be apparent to those skilled in the art that various modifications and changes are possible within the technical scope of the present invention and their equivalents.

INDUSTRIAL APPLICABILITY

The present invention can be used as a means for preventing a sleeve, which is repeatedly bent and stretched while accommodating a transmission line such as a cable or an air hose, from being slack.

The invention claimed is:

1. A support module of a sleeve for a transmission line that is inserted into a part of a plurality of accommodation spaces formed at a flexible sleeve for a transmission line to prevent the sleeve for a transmission line from being slack, the support module comprising:
    a flexible flat plate;
    a plurality of bases that is fixed to the flat plate so as to be arranged in a longitudinal direction of the flat plate;
    a plurality of slack-preventing blocks that is connected to the bases so as to be positioned at a top of the flat plate and prevents the flat plate from being slack by coming in contact with each other; and
    a plurality of bending-degree restricting blocks that is connected to the bases and the slack-preventing blocks so as to be positioned a bottom of the flat plate and restricts a bending degree of the flat plate by coming in contact with each other.

2. The support module of a sleeve for a transmission line according to claim 1, wherein projections are formed at a top surface and a bottom surface of the base, and holes into which the projections are inserted are formed in the slack-preventing block and the bending-degree restricting block.

3. The support module of a sleeve for a transmission line according to claim 1, wherein protrusions are formed at any one left and right sidewalls of the slack-preventing block and left and right sidewalls of the bending-degree restricting block that are spaced apart in a width direction of the flat plate, and hooked holes into which the protrusions are hooked are formed at the other left and right sidewalls.

4. The support module of a sleeve for a transmission line according to claim 1, wherein front and rear surfaces that extend in a width direction of the flat plate among side surfaces of the bending-degree restricting block are inclined surfaces in which as the front and rear surfaces are farther from the flat plate, the front and rear surfaces are close to each other.

5. The support module of a sleeve for a transmission line according to claim 4,
    wherein a projection is formed at the front surface of the bending-degree restricting block,
    an insertion groove having a ceiling is formed at the rear surface of the bending-degree restricting block, and
    a top surface of the projection is an inclined surface in which as the top surface is farther from the front surface, the top surface is farther from the flat plate.

6. The support module of a sleeve for a transmission line according to claim 1, further comprising:
    finishing members that are connected to both ends of the sleeve for a transmission line to fix the bases.

7. The support module of a sleeve for a transmission line according to claim 6, wherein the finishing member includes an upper block and a lower block that are connected to each other while pressing the both ends of the sleeve for a transmission line and the bases that are positioned at the both ends.

8. The support module of a sleeve for a transmission line according to claim 7,
    wherein projections are formed at a top surface or a bottom surface of the base,
    through holes through which the projections pass are formed in the both ends of the sleeve for a transmission line, and
    insertions holes into which the projections that have passed through the through holes are inserted are formed in the upper block and the lower block.

9. The support module of a sleeve for a transmission line according to claim 7,
    wherein the finishing member includes an upper lid that extends from the upper block and a lower lid that extends from the lower block, and
    portions of the sleeve for a transmission, which accommodate the outermost slack-preventing block and the outmost bending-degree restricting block, are positioned between the upper lid and the lower lid.

10. The support module of a sleeve for a transmission line according to claim 9, wherein gaps are formed between lower ends of both side surfaces of the upper lid and upper ends of both side surfaces of the lower lid.

11. A support module of a sleeve for a transmission line that is inserted into a part of a plurality of accommodation spaces formed at a flexible sleeve for a transmission line to prevent the sleeve for a transmission line from being slack, the support module comprising:
    a flexible flat plate; and
    a plurality of slack-preventing blocks that prevents the flat plate from being slack by coming in contact with each other at a top of the flat plate,
    wherein linear convex portions that extend in a longitudinal direction of the flat plate are formed at an outer surface of the flat plate.

12. The support module of a sleeve for a transmission line according to claim 11, wherein the linear convex portions are formed at a bottom surface of the flat plate, and linear concave portions that extend in the longitudinal direction of the flat plate while facing the linear convex portions are formed at a top surface of the flat plate.

13. The support module of a sleeve for a transmission line according to claim 11, wherein the linear convex portions are formed at a top surface of the flat plate, and linear concave portions that extend in the longitudinal direction of the flat plate while facing the linear convex portions are formed at a bottom surface of the flat plate.

14. The support module of a sleeve for a transmission line according to claim 11, wherein the linear convex portions are formed at both of a top surface and a bottom surface of the flat plate.

15. The support module of a sleeve for a transmission line according to claim 11, wherein the linear convex portions are positioned to be symmetrical with a central line of the flat plate.

16. The support module of a sleeve for a transmission line according to claim 11, further comprising:
    a plurality of bases that is fixed to the flat plate so as to be arranged in a longitudinal direction and is connected to the slack-preventing blocks; and
    a plurality of bending-degree restricting block that is connected to the bases and the slack-preventing blocks so as to be positioned at a bottom of the flat plate and restricts a bending degree of the flat plate by coming in contact with each other.

17. The support module of a sleeve for a transmission line according to claim 16, wherein projections are formed at a top surface and a bottom surface of the base, and holes into which the projections are inserted are formed in the slack-preventing block and the bending-degree restricting block.

18. The support module of a sleeve for a transmission line according to claim 16, wherein protrusions are formed at any one left and right sidewalls of the slack-preventing block and left and right sidewalls of the bending-degree restricting block that are spaced apart in a width direction of the flat plate, and hooked holes into which the projections are hooked are formed at the other left and right sidewalls.

* * * * *